(12) United States Patent
Yuan et al.

(10) Patent No.: US 11,949,553 B2
(45) Date of Patent: Apr. 2, 2024

(54) TRANSMISSION PARAMETER CONFIGURATION METHOD AND APPARATUS

(71) Applicant: HUAWEI TECHNOLOGIES CO., LTD., Shenzhen (CN)

(72) Inventors: Shitong Yuan, Chengdu (CN); Fengwei Liu, Chengdu (CN); Lei Chen, Shenzhen (CN); Jing Qiu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 370 days.

(21) Appl. No.: 17/213,768

(22) Filed: Mar. 26, 2021

(65) Prior Publication Data

US 2021/0218620 A1 Jul. 15, 2021

Related U.S. Application Data

(63) Continuation of application No. PCT/CN2019/108994, filed on Sep. 29, 2019.

(30) Foreign Application Priority Data

Sep. 28, 2018 (CN) .......................... 201811143574.9

(51) Int. Cl.
*H04L 12/24* (2006.01)
*H04L 41/0803* (2022.01)
*H04L 41/0896* (2022.01)

(52) U.S. Cl.
CPC ...... *H04L 41/0803* (2013.01); *H04L 41/0896* (2013.01)

(58) Field of Classification Search
CPC ..... H04W 76/19; H04B 7/0695; H04B 7/088; H04L 41/0896; H04L 5/0094
See application file for complete search history.

(56) References Cited

U.S. PATENT DOCUMENTS

2009/0016263 A1* 1/2009 Kishigami ............ H04L 1/1671
370/328
2018/0097547 A1 4/2018 Turtinen et al.
(Continued)

FOREIGN PATENT DOCUMENTS

CN 101345984 A 1/2009
CN 102291209 A 12/2011
(Continued)

OTHER PUBLICATIONS

3GPP TS 38.331 V15.3.0:"3rd Generation Partnership Project;Technical Specification Group Radio Access Network; NR;Radio Resource Control (RRC) protocol specification(Release 15)",Oct. 1, 2018,total 445 pages.
(Continued)

*Primary Examiner* — Awet Haile
(74) *Attorney, Agent, or Firm* — Rimonlaw

(57) ABSTRACT

In a transmission parameter configuration method, a first node receives a transmission configuration message, where the transmission configuration message includes transmission configuration index information and a transmission parameter corresponding to the transmission configuration index information, and the transmission configuration index information is used to identify different transmission modes. The first node obtains a transmission indication message, where the transmission indication message includes the transmission configuration index information, and the transmission indication message is used to indicate to the first node to apply the transmission parameter corresponding to the transmission configuration index information. The first node performs, based on the transmission configuration index information, data transmission by using the transmission parameter corresponding to the transmission configuration index information. The method can meet requirements of more application scenarios, support more (Continued)

transmission modes, and reduce overheads caused by transmission parameters.

18 Claims, 7 Drawing Sheets

(56) References Cited

U.S. PATENT DOCUMENTS

| | | | | |
|---|---|---|---|---|
| 2018/0124774 | A1* | 5/2018 | Takahashi | H04B 7/0645 |
| 2020/0275398 | A1* | 8/2020 | Da | H04L 5/0092 |
| 2020/0322893 | A1* | 10/2020 | Yao | H04L 25/0226 |
| 2021/0195539 | A1* | 6/2021 | Sheng | H04W 88/14 |
| 2021/0195675 | A1* | 6/2021 | Park | H04W 88/14 |
| 2022/0110179 | A1* | 4/2022 | Sheng | B65D 5/241 |

FOREIGN PATENT DOCUMENTS

| | | |
|---|---|---|
| CN | 102378387 A | 3/2012 |
| CN | 103326832 A | 9/2013 |
| CN | 107736004 A | 2/2018 |
| CN | 108134659 A | 6/2018 |
| CN | 108135028 A | 6/2018 |
| WO | 2017004253 A1 | 1/2017 |
| WO | 2018107520 A1 | 6/2018 |
| WO | 2018137698 A1 | 8/2018 |
| WO | 2018144433 A1 | 8/2018 |

OTHER PUBLICATIONS

Huawei, HiSilicon, Physical layer design for NR IAB. 3GPP TSG RAN WG1 Meeting #94, Gothenburg, Sweden, Aug. 20-24, 2018, R1-1808101, 14 pages.

ATandT, Enhancements to support NR backhaul links. 3GPP TSG RAN WG1 Meeting #94, Gothenburg, Sweden, Aug. 20-24, 2018, R1-1809072, 10 pages.

Qualcomm, Status Report to TSG. 3GPP TSG RAN meeting #81, Gold Coast, Australia, Sep. 10-13, 2018, RP-181649; 24 total pages.

* cited by examiner

TRANSMISSION PARAMETER CONFIGURATION METHOD AND APPARATUS

CROSS-REFERENCE TO RELATED APPLICATIONS

This application is a continuation of International Application No. PCT/CN2019/108994, filed on Sep. 29, 2019, which claims priority to Chinese Patent Application No. 201811143574.9, filed on Sep. 28, 2018. The disclosures of the aforementioned applications are hereby incorporated by reference in their entireties.

TECHNICAL FIELD

This application relates to the communications field, and more specifically, to a transmission parameter configuration method and related apparatus.

BACKGROUND

In a 5th generation communications system 5th generation (5G) communications system, an integrated access and backhaul (IAB) node is an evolved node of a relay technology. In a wireless communications network, a relay node is usually configured to implement extended coverage or coverage hole, or is configured to increase a system capacity. In terms of functions, the IAB node is classified into: an IAB mobile terminal (MT) and an IAB base station distributed unit (DU). The IAB MT means that an IAB node is used as terminal equipment (TE) and is connected to a parent node. The IAB DU refers to an IAB node that serves as a base station distributed unit and provides an access service for the UE and another downstream node.

When the IAB node accesses a network, a link used by the IAB DU to provide a service for the UE is referred to as an access link (AL), and a link used to send data to another IAB node is referred to as a backhaul link (BL). If a transmission parameter configuration method in a current technology is still used, an existing transmission parameter is configured by using higher layer signaling, causing excessively large signaling overheads at the IAB node and a relatively long delay, especially in a transmission mode that is based on dynamic scheduling. This greatly affects transmission performance of the node. Therefore, how to implement configuration of a transmission parameter of an IAB node in more transmission modes and in more supported application scenarios is a problem that needs to be addressed in current IAB standardization.

SUMMARY

In view of this, this application provides a transmission parameter configuration method and related apparatus. By using transmission configuration index information and a transmission parameter corresponding to the configuration transmission configuration index information, this application can implement more application scenarios, support more transmission modes, and reduce overheads caused by configuring a transmission parameter. For example, a transmission parameter is more flexibly and quickly configured, adjusted, and switched in scenarios such as spatial multiplexing and non-spatial multiplexing.

According to a first aspect, a transmission parameter configuration method includes:

A first node receives a transmission configuration message, where the transmission configuration message includes transmission configuration index information and a transmission parameter corresponding to the transmission configuration index information, and the transmission configuration index information is used to identify different transmission modes;

the first node obtains a transmission indication message, where the transmission indication message includes the transmission configuration index information, and the transmission indication message is used to indicate to the first node to apply the transmission parameter corresponding to the transmission configuration index information; and the first node performs, based on the transmission configuration index information, data transmission by using the transmission parameter corresponding to the transmission configuration index information.

According to the transmission parameter configuration method provided in this embodiment of this application, because transmission parameters that need to be configured for nodes are different in different transmission modes, transmission parameters in the different transmission modes are combined by identifying transmission configuration index information of different transmission modes. During transmission, each corresponding transmission parameter set may be learned by configuring transmission modes to transmit the transmission configuration index information. This not only reduces signaling overheads caused by a large quantity of parameters during transmission, but also greatly reduces a transmission delay and improves transmission performance by using lower layer signaling such as DCI. In this way, switching from one transmission mode to another transmission mode can be quickly implemented.

According to a second aspect, a transmission parameter configuration method includes:

A second node generates a transmission configuration message, where the transmission configuration message includes transmission configuration index information and a transmission parameter corresponding to the transmission configuration index information, and the transmission configuration index information is used to identify different transmission modes; and the second node sends the transmission configuration message.

According to the transmission parameter configuration method provided in this embodiment of this application, because transmission parameters that need to be configured for nodes are different in different transmission modes, transmission parameters in the different transmission modes are combined by identifying transmission configuration index information of different transmission modes. During transmission, each corresponding transmission parameter set may be learned by configuring transmission modes to transmit the transmission configuration index information. This not only reduces signaling overheads caused by a large quantity of parameters during transmission, but also greatly reduces a transmission delay and improves transmission performance by using lower layer signaling such as DCI. In this way, switching from one transmission mode to another transmission mode can be quickly implemented.

According to a third aspect, a transmission apparatus includes:

a transceiver, configured to receive a transmission configuration message, where the transmission configuration message includes transmission configuration index information and a transmission parameter corresponding to the transmission configuration index information, and the transmission configuration index information is used to identify different transmission modes; and a processor, configured to: obtain a transmission indication message, where the transmission indication message includes the transmission configuration index information, and the transmission indication message is used to indicate the transmission apparatus to apply the transmission parameter corresponding to the transmission configuration index information; determine, based on the transmission configuration index information, the transmission parameter corresponding to the transmission configuration index information; and perform data transmission by using the determined transmission parameter.

According to a fourth aspect, a transmission apparatus includes:

a processor, configured to generate a transmission configuration message, where the transmission configuration message includes transmission configuration index information and a transmission parameter corresponding to the transmission configuration index information, and the transmission configuration index information is used to identify different transmission modes; and a transceiver, configured to send the transmission configuration message.

According to a fifth aspect, a transmission apparatus includes:

a memory, configured to store a program; and a processor, configured to execute the program stored in the memory. When the program is executed, the processor is configured to perform the method according to the first aspect or the second aspect.

According to a sixth aspect, a transmission apparatus includes:

a computer-readable storage medium, including an instruction. When the instruction is run on a computer, the computer is enabled to perform the method according to the first aspect or the second aspect.

According to a seventh aspect, a transmission apparatus includes a computer program product. The computer program product includes computer program code. When the computer program code is run on a computer, the computer performs the method according to the first aspect or the second aspect.

According to an eighth aspect, a chip includes: a memory and a processor. The memory is configured to store a computer program, and the processor is configured to invoke the computer program from the memory and run the computer program, so that the processor performs the method according to the first aspect or the second aspect.

DESCRIPTION OF EMBODIMENTS

The following describes the technical solutions in this application with reference to the accompanying drawings.

Figure 1:
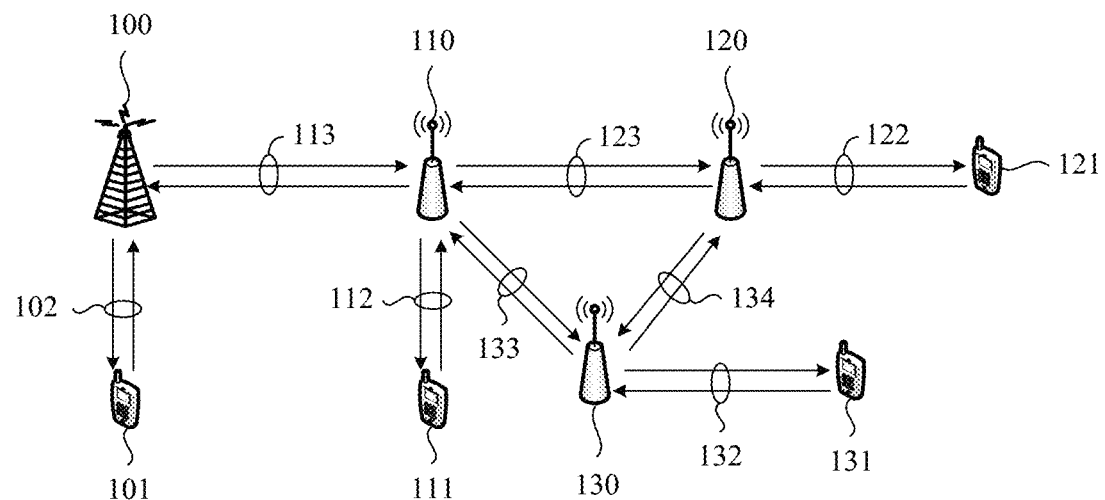
FIG. 1 is a system architectural diagram for which an embodiment of this application is used.

FIG. 1 is a schematic diagram of a communications system according to an embodiment of this application. As shown in FIG. 1, the communications system includes: a base station, at least one terminal equipment, at least one relay node, and the like. The terminal equipment and the relay node are located in coverage of a network device and communicate with the network device, to implement the following technical solutions provided in the embodiments of this application. The communications system in this embodiment may be used for a scenario with a plurality of transmission and reception points (TRP).

The embodiments of this application describe each embodiment with reference to the network device and the terminal equipment. The network device and the terminal equipment may work on a licensed band or an unlicensed band.

The terminal equipment may also be referred to as user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal equipment may be a station (STATION, ST) in a wireless local area network (WLAN), or may be a cellular phone, a cordless phone, a session initiation protocol (session initiation protocol, SIP) phone, a wireless local loop (WLL) station, a personal digital assistant (PDA) device, a handheld device with a wireless communication function, a computing device or another processing device connected to a wireless modem, a vehicle-mounted device, a wearable device, and a next-generation communications system, for example, terminal equipment in a 5th generation communications (5G) network or terminal equipment in a future evolved public land mobile network (PLMN) network, or terminal equipment in an NR system.

By way of example and not limitation, in this embodiment of this application, the terminal equipment may alternatively be a wearable device. The wearable device may also be referred to as a wearable intelligent device, and is a generic term for wearable devices such as glasses, gloves, watches, clothes, and shoes that are developed by using wearable technologies to perform intelligent design of daily wear. The wearable device is a portable device that can be directly worn by a user or integrated into clothes or an accessory of a user. The wearable device is not only a hardware device, and is even more used to implement powerful functions through software support, data exchange, and cloud interaction. Generalized wearable intelligent devices include full-featured and large-size devices that can implement complete or partial functions without depending on smartphones, for example, a smartwatch or smart glasses, and devices that focus only on one type of application function and need to work with another device such as a smartphone, for example, various smart bands or smart jewelry for monitoring physical signs.

In addition, the network device is also referred to as radio access network (RAN) equipment, and is equipment that connects terminal equipment to a wireless network. The network device may be an evolved Node B (eNB or eNodeB) in long term evolution (LTE), a relay station or an access point, a network device in a 5G network or a network device in a future evolved PLMN network, a new radio Node B (gNB) in an NR system, or the like. This is not limited herein.

In addition, in the embodiments of this application, the network device provides a service for a cell, and the terminal equipment communicates with the network device by using a transmission resource (for example, a frequency domain resource or a spectrum resource) used in the cell. The cell may be a cell corresponding to a network device (for example, a base station). The cell may belong to a macro base station, or may belong to a base station corresponding to a small cell (small cell). The small cell herein may include: a metro cell (Metro cell), a micro cell (Micro cell), a pico cell (Pico cell), a femto cell (Femto cell), or the like. These small cells have such features as small coverage and low transmit power, and are applicable to providing a high-rate data transmission service.

FIG. 1 is a schematic structural diagram of a communications system to which this embodiment of this application is applicable.

It should be noted that the communications system mentioned in this embodiment of this application includes but is not limited to: a narrowband internet of things (NB-IoT) system, a long term evolution (LTE) system, a 5G mobile communications system or a communications system after the 5G, or a device to device (D2D) communications system.

In the communications system shown in FIG. 1, an integrated access and backhaul IAB system is provided. One IAB system includes at least one base station 100, one or more terminals 101 served by the base station 100, one or more relaying transmission reception points (relaying TRP, rTRP) 110 (where the relaying transmission reception point is referred to as a relay node for short below), and one or more terminals 111 served by the rTRP 110. The base station 100 is usually referred to as a donor base station (DgNB), and the rTRP 110 is connected to the base station 100 by using a wireless backhaul link 113. In this application, and the donor base station is also referred to as a donor node. The base station includes but is not limited to: an evolved NodeB (eNB), a radio network controller (RNC), a Node B (NB), a base station controller (BSC), a base transceiver station (BTS), a home evolved NodeB (for example, a home evolvedNodeB, or a home NodeB, HNB), a baseband unit (BBU), a next-generation new radio base station (for example, a gNB), or the like.

The integrated access and backhaul system may also include a plurality of other relay nodes, for example an rTRP 120 and an rTRP 130. The rTRP 120 is connected to the relay node rTRP 110 through the wireless backhaul link 123 to access a network. The rTRP 130 is connected to the relay node rTRP 110 through the wireless backhaul link 133 to access the network. The rTRP 120 serves one or more terminals 121, and the rTRP 130 serves one or more terminals 131. In FIG. 1, both the relay nodes rTRP 110 and rTRP 120 are connected to the network through the wireless backhaul links. In this application, the wireless backhaul links are all viewed from a perspective of the relay node. For example, the wireless backhaul link 113 is a backhaul link of the relay node rTRP 110, and the wireless backhaul link 123 is a backhaul link of the relay node rTRP 120. As shown in FIG. 1, one relay node, for example, the relay node 120, may be connected to another relay node 110 through a wireless backhaul link, for example, the wireless backhaul link 123, so as to access the network. In addition, the relay node may access the network through multilevel wireless relay nodes.

Usually, a node that provides a resource of the wireless backhaul link, for example, the relay node 110, is referred to as a parent node of the relay node 120, and the relay node 120 is referred to as a child node of the relay node 110. Usually, a child node may be considered as a terminal of a parent node. It should be understood that in the integrated access and backhaul system shown in FIG. 1, one relay node is connected to one parent node. However, in a future relay system, to improve reliability of the wireless backhaul link, one relay node, for example, the relay node 120, may have a plurality of parent nodes that simultaneously provide a service for the one relay node. For example, the rTRP 130 in the figure may also be connected to the relay node rTRP 120 through a backhaul link 134, that is, both the rTRP 110 and the rTRP 120 are upper level nodes of the rTRP 130. In this application, the terminals 101, 111, 121, and 131 may be static or mobile devices. For example, the mobile device may be a mobile phone, an intelligent terminal, a tablet computer, a notebook computer, a video game console, a multimedia player, or even a mobile relay node. The static device is usually located at a fixed location, for example, a computer or an access point (which accesses a network through a wireless link, for example, a static relay node). Names of the relay nodes rTRPs 110, 120, and 130 do not constitute a limitation on a scenario or a network in which the relay nodes rTRPs 110, 120, and 130 are deployed, and there may be any other name such as relay or RN. In this application, the rTRP is used only for ease of description.

In FIG. 1, wireless links 102, 112, 122, 132, 113, 123, 133, and 134 may be bidirectional links, including uplink and downlink transmission links. Specifically, the wireless backhaul links 113, 123, 133, and 134 may be used by the parent node to provide a service for the child node. For example, a parent node 100 provides a wireless backhaul service for a child node 110. It should be understood that uplink and downlink of the backhaul link may be separated from each other. To be specific, transmission on an uplink and transmission on a downlink are not performed through a same node. The downlink transmission refers to transmitting information or data from the parent node such as the node 100 to the child node such as the node 110. The uplink transmission refers to transmitting information or data from the child node such as the node 110 to the parent node such as the node 100. The node is not limited to a network node or a terminal. For example, in a D2D scenario, a terminal may be used as a relay node to serve another terminal. In some scenarios, the wireless backhaul link may also be an access link. For example, the backhaul link 123 may also be considered as an access link for the node 110, and the backhaul link 113 is also an access link for the node 100. It should be understood that the parent node may be a base station or a relay node, and the child node may be a relay node or a terminal having a relay function. For example, in the D2D scenario, the child node may be a terminal.

In FIG. 1, the donor node is a node, and a core network can be accessed through the node. Alternatively, the donor node is an anchor base station in a radio access network, and a network can be accessed through the anchor base station. The anchor base station is responsible for data processing at a packet data convergence protocol (PDCP) layer, or responsible for receiving data from the core network and forwarding the data to the relay node, or receiving data from the relay node and forwarding the data to the core network.

For ease of description, the relay node is referred to as a first node below, and a parent node of the first node is referred to as a second node. The first node and the second node may be a base station, a relay node, a terminal having a relay function, or any device having a relay function.

When the relay node is under a half-duplex constraint, spectrum resources of the wireless backhaul link of the in-band relay overlap with spectrum resources of the access link of the in-band relay. That is, the backhaul link of the in-band relay and the access link of the in-band relay have a same frequency band. For example, when the rTRP performs receiving on a downlink wireless backhaul link of the base station, the rTRP cannot perform transmission to a subordinate terminal or device. When the rTRP performs uplink transmission to a parent node on a backhaul link, the rTRP cannot receive transmission performed by a subordinate terminal or device on an uplink access link or a backhaul link of a child node. It should be understood that the half-duplex constraint of the in-band relay refers to a half-duplex constraint for simultaneous intra-frequency receiving and sending, and is unrelated to time division duplex (TDD) or frequency division duplex (FDD) used by the system.

Some common technical terms are defined as follows:

Access link: An access link is a radio link used by a node to communicate with a child node of the node, and includes an uplink transmission link and a downlink transmission link. Uplink transmission on the access link is also referred to as the uplink transmission of the access link, and downlink transmission on the access link is also referred to as the downlink transmission of the access link. The node includes but is not limited to the foregoing IAB node.

Backhaul link: A backhaul link is a radio link used by a node to communicate with a parent node of the node, and includes an uplink transmission link and a downlink transmission link. Uplink transmission on the backhaul link is also referred to as uplink transmission of the backhaul link, and downlink transmission on the backhaul link is also referred to as downlink transmission of the backhaul link. The node includes but is not limited to the foregoing IAB node.

A beam (beam) may be understood as a spatial resource, and may refer to a transmit or receive precoding vector with energy transmission directivity. In addition, the transmit or receive precoding vector can be identified by using index information. The energy transmission directivity may mean that the precoding vector is used to perform precoding processing on a signal that needs to be sent, so that the signal obtained after the precoding processing is performed has specific spatial directivity, and that a received signal obtained after the precoding processing is performed by using the precoding vector has relatively good received power. For example, a receiving signal-to-noise ratio satisfies requirement for demodulation. The energy transmission directivity may also mean that same signals sent from different spatial locations and received by using the precoding vector have different received power. Optionally, a same communications device, for example, terminal equipment or a network device, may have different precoding vectors, and different communications devices may also have different precoding vectors, that is, correspond to different beams.

For a configuration or a capability of a communications device, the communications device may simultaneously use one or more of a plurality of different precoding vectors. In other words, the communications device may simultaneously form one or more beams. Beam information may be identified by using index information. Optionally, the index information may be used to correspondingly configure a resource identity (ID) of the terminal equipment. For example, the index information may correspond to an ID or an index (index) or a resource of a configured channel state information reference signal (CSI-RS), or may correspond to an ID or a resource of a configured uplink sounding reference signal (SRS). Alternatively, the index information may also be index information explicitly or implicitly carried by using a signal or a channel carried on a beam. For example, the index information may include but is not limited to index information that is of a beam and that is indicated by a synchronization signal or a broadcast channel sent by using the beam. The resource may be at least one of the following: a time domain resource, a frequency domain resource, or a code domain resource (sequence).

It should be understood that the term "and/or" in this specification describes only an association relationship for describing associated objects and represents that three relationships may exist. For example, A and/or B may represent the following three cases: Only A exists, both A and B exist, and only B exists.

In addition, because 5G NR supports a high frequency band and uses a large-scale antenna technology (Massive MIMO), energy of a signal can be centrally transmitted in a direction. In this way, an IAB device can simultaneously receive signals transmitted from a plurality of directions. The following further describes some schematic diagrams of system composition in spatial transmission in IAB.

Figure 2:
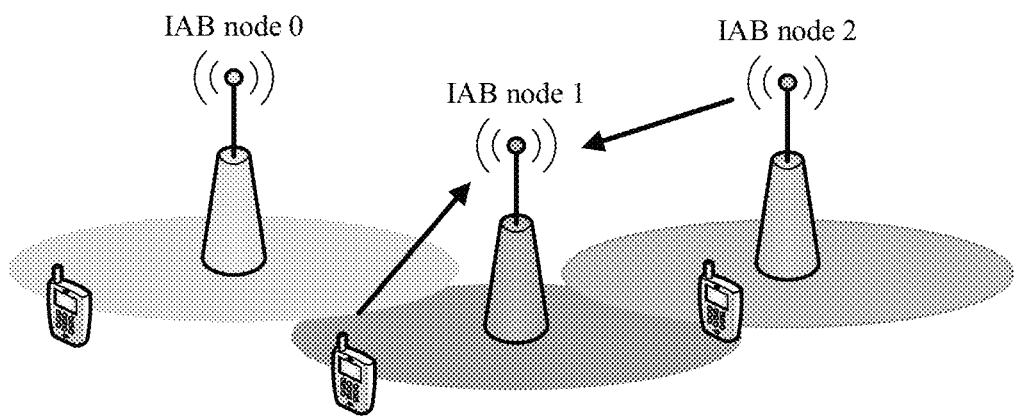
FIG. 2 to FIG. 5 are another system architectural diagram according to an embodiment of this application.
Figure 3:
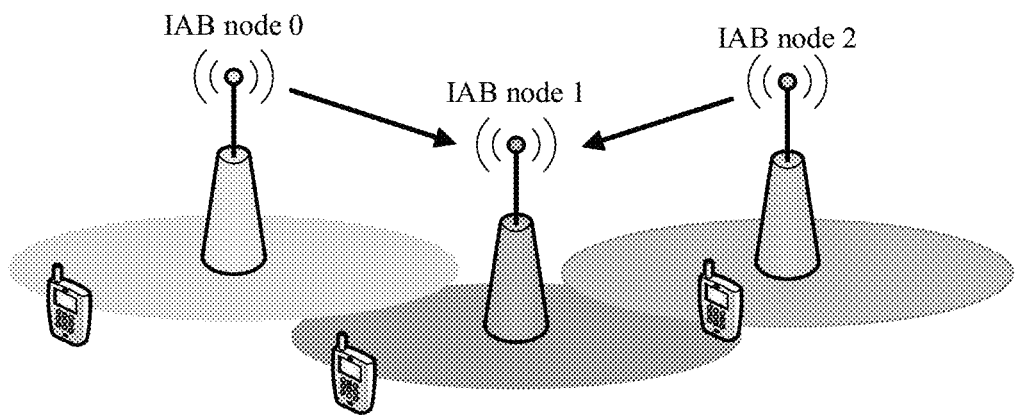
Figure 4:
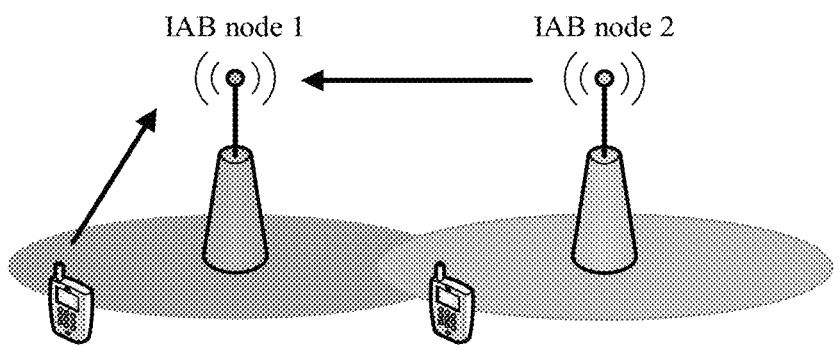
Figure 5:
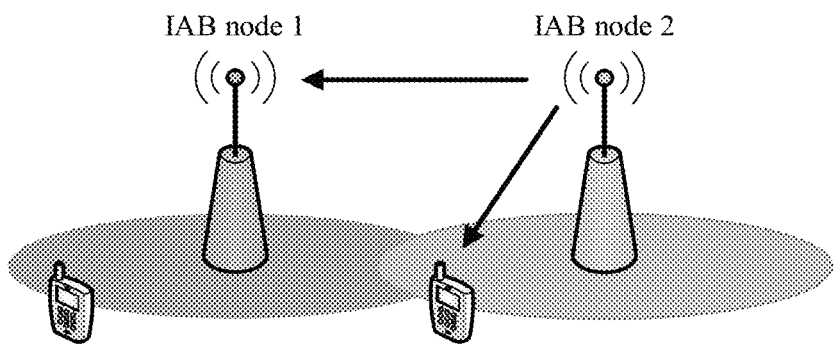

As shown in FIG. 2 to FIG. 5, an IAB system includes IAB devices, for example, an IAB node 0, an IAB node 1, and an IAB node 2, and terminal equipment UE served by the IAB devices. In FIG. 2, the IAB node 1 simultaneously receives an uplink signal from the UE and an uplink signal from the IAB node 2. In FIG. 3, the UE served by the IAB node 1, and an adjacent node IAB node 2 simultaneously send uplink signals, and the IAB node 1 simultaneously receives uplink signals from the UE and from the IAB node 0 and the IAB node 2. In FIG. 4, the UE served by the IAB node 1, and the IAB node 2 simultaneously send uplink signals, and the IAB node 1 simultaneously receives uplink signals from the UE and uplink signals from the IAB node 2. In FIG. 5, at a time point or in a time period, the IAB node 2 sends a downlink signal to the UE, and simultaneously sends an uplink signal to the IAB node 1.

Figure 6:
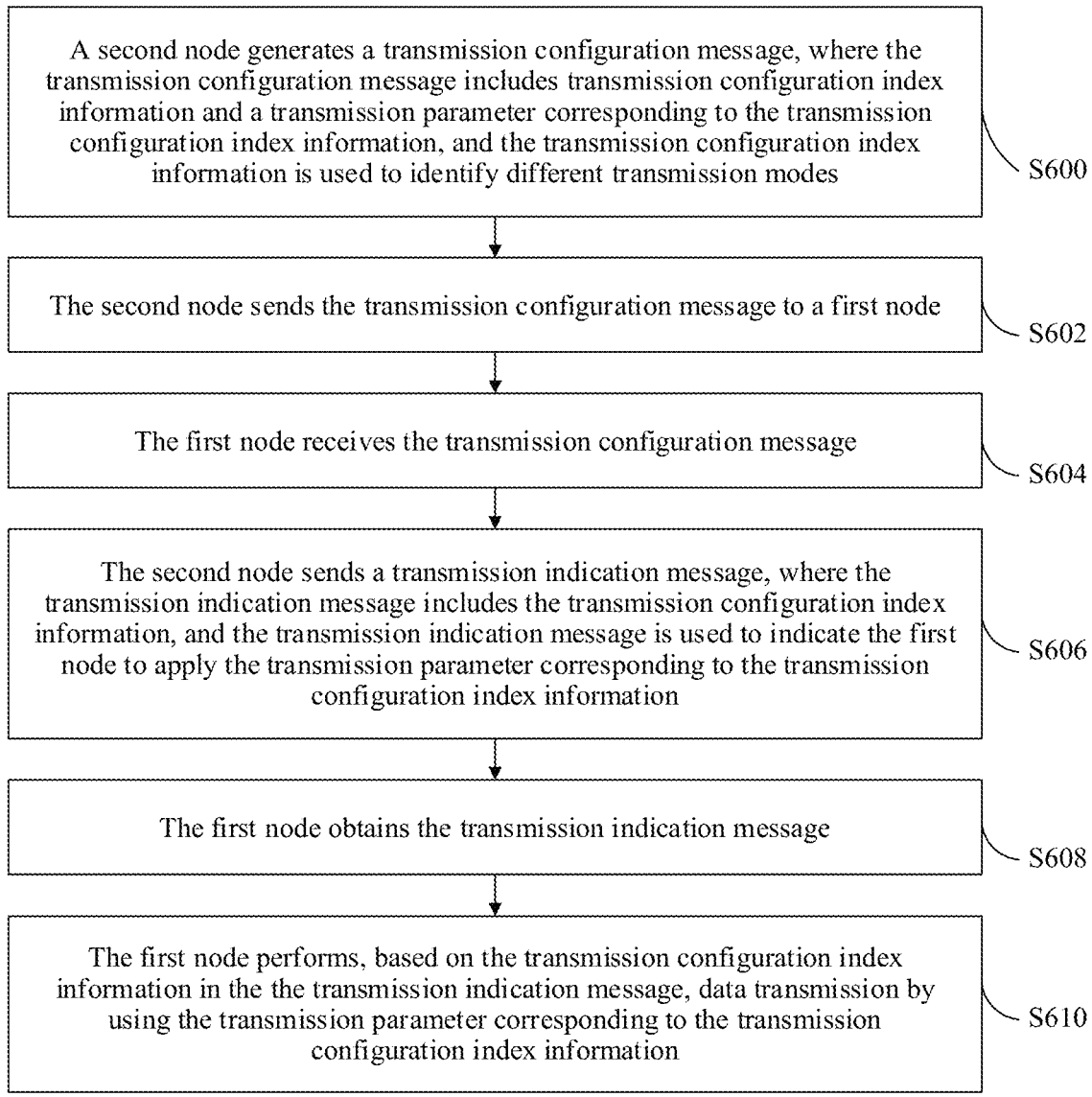
FIG. 6 is a schematic flowchart of a transmission parameter configuration method according to an embodiment of this application.

FIG. 6 is a flowchart of a transmission parameter configuration method according to an embodiment of this application. The embodiment shown in FIG. 6 is described below.

The following describes the transmission parameter configuration method by using an example in which a relay node in IAB is an IAB node and by using an IAB system architecture shown in FIG. 3 as an example. For ease of description, an IAB node 1 is used as a first node, and a parent node of the first node is a second node. For example, an IAB Node 0 may also be referred to as an upstream node of the first node, and a child node or a downstream node of the first node is an IAB Node 2. The first node, the second node and a third node may be a base station, a relay node, a terminal having a relay function, or any device having a relay function. At a time point or in a time period, the IAB node 1 simultaneously receives signals from the IAB node 0 and the IAB node 2, or the IAB node 1 simultaneously sends signals to the IAB node 0 and the IAB node 2.

S600. The second node generates a transmission configuration message, where the transmission configuration message includes transmission configuration index information and a transmission parameter corresponding to the transmission configuration index information, and the transmission configuration index information is used to identify different transmission modes.

The transmission parameter includes at least one or more of the following: timing adjustment information, DMRS port information, a power control parameter, time resource information, slot direction information, receive beam information, transmit beam information, a subcarrier spacing, or an effective time.

The transmission mode includes: spatial multiplexing transmission and/or non-spatial multiplexing transmission.

The timing adjustment information is used to adjust a sending time of the first node or a receiving time of the first node, and the timing adjustment information is obtained by the first node through calculation.

The transmission configuration index information includes a bandwidth part identity (BWP ID).

The transmission configuration message may be carried in a radio resource control (RRC) protocol message, or carried, through an F1 interface, in a message that is based on an F1-AP (F1-application protocol) protocol, for example, a downlink radio resource control transfer message (DL RRC TRANSFER message). The F1 interface is an F1 interface between a distributed unit (DU) of the IAB node 2 and a central unit (CU) of a donor node, or is carried in a downlink control information (DCI) or a MAC CE (media access control control element).

Alternatively, the transmission configuration message may be sent by the donor node to an MT of the IAB node 2 by using the RRC, the DCI, or the MAC CE, and then the MT of the IAB node 2 notifies the DU of the IAB node 2 through internal signaling interaction.

Because transmission parameters that need to be configured for nodes are different in different transmission modes, transmission parameters in the different transmission modes are combined by identifying transmission configuration index information of different transmission modes. During transmission, each corresponding transmission parameter set may be learned by configuring transmission configuration index information of a transmission mode. This not only reduces signaling overheads caused by a large quantity of parameters during transmission, but also greatly reduces a transmission delay and improves transmission performance by using lower layer signaling such as the DCI. In this way, switching from one transmission mode to another transmission mode can be quickly implemented.

The transmission parameter includes the timing adjustment information. Because values of the timing adjustment information are different in different transmission modes, the following describes a method for obtaining the timing adjustment information by the node in the spatial multiplexing transmission mode and the non-spatial multiplexing transmission mode.

Figure 7:
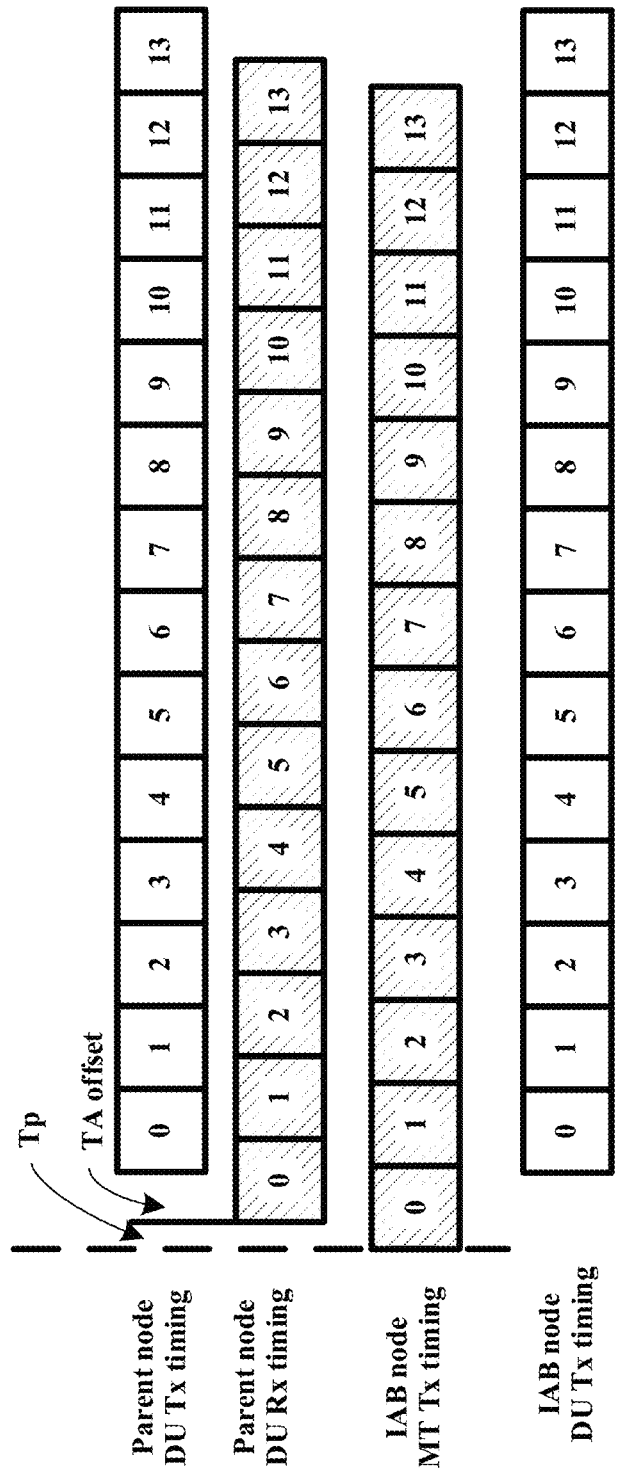
FIG. 7 is a structural diagram of time synchronization according to an embodiment of this application.

As shown in FIG. 7 and FIG. 3, the embodiments are described as follows:

FIG. 7 shows a transmission mode in which non-spatial multiplexing is performed. A downlink sending time of an IAB node DU is aligned with a parent node (Parent node DU Tx timing) where timings in the first row and the fourth row in the figure are aligned. This is because in a TDD system, downlink timings between cells are generally aligned synchronously. Otherwise, severe inter-cell cross-link interference is caused, and the performance is adversely affected. The 3GPP specification specifies that, there is a TA offset between uplink reception (the second row in the figure) and downlink transmission (the first row in the figure). When the IAB node functions as a child node, there is a transmission delay (a distance between nodes divided by the speed of light) between the time of the downlink transmission (the third row in the figure) and the time of the uplink reception of the parent node.

Figure 8:
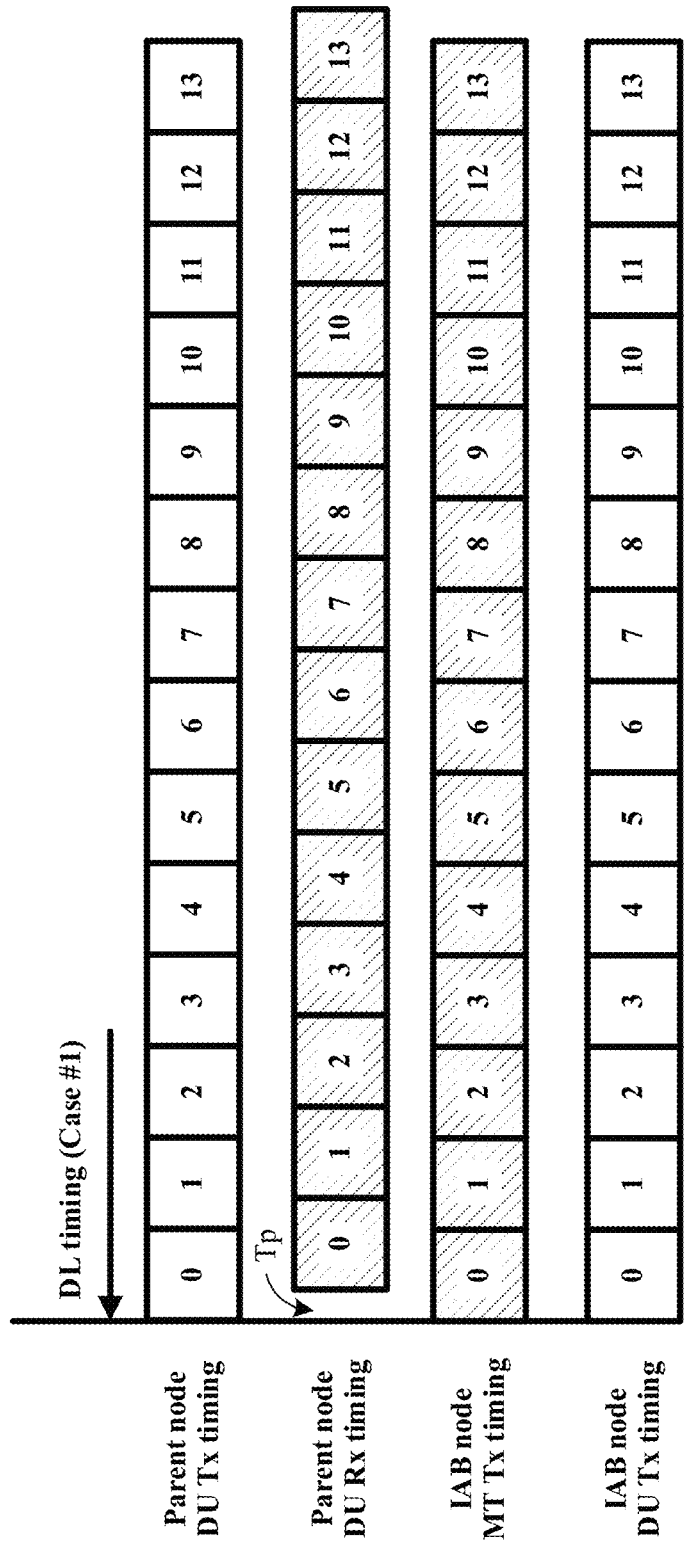
FIG. 8 is a structural diagram of time synchronization according to an embodiment of this application.

FIG. 8 shows a transmission mode in which spatial multiplexing is performed. In this transmission mode, the network architecture in FIG. 3 is used as an example. Each IAB node includes a first functional entity MT and a second functional entity DU. The MT and the DU may be integrated, or may run independently. Different transmission parameters need to be applied when backhauled downlink data of an IAB node 0 is received in a conventional manner and when spatial reception is enabled.

In the spatial multiplexing, a transmit timing of an uplink transmit signal (the third row in the figure) of the IAB node (that is, an IAB node MT Tx timing in FIG. 7) is aligned with a transmit timing of a downlink transmit signal (the fourth row in the figure) of the IAB node (that is, an IAB node DU Tx timing in FIG. 7). That is, the IAB node MT Tx timing needs to be aligned with the IAB node DU Tx timing.

If a reception timing of a parent node is not considered, it can be learned by comparing FIG. 7 and FIG. 8 that, to implement spatial transmission of the IAB node in the spatial multiplexing, the uplink transmission timing of the IAB node needs to be adjusted. Specifically, the uplink transmission of the first node is to delay the IAB node MT Tx timing by a timing adjustment amount TA, for example, a Tp+TA_offset. A specific TA adjustment amount may be obtained through measurement, and there are generally the following two manners:

Method 1: With reference to FIG. 3, first, an IAB node DU sends a downlink reference signal, and a DU of a parent node IAB node 0 receives the downlink reference signal or a donor node measures the downlink reference signal, to obtain a transmission timing of a transmit signal of the IAB node DU.

Second, the DU of the IAB node 0 may obtain a time of arrival at the parent node when a child node sends the signal based on the downlink transmission timing (the fourth row in FIG. 2).

In comparison with a time when uplink transmission of the child node arrives at the parent node (the second row in FIG. 1) when spatial multiplexing is not enabled, the parent node may obtain one timing adjustment amount.

Then, the timing adjustment amount of the IAB is obtained based on the IAB node DU Tx timing (IAB node DU Tx timing) and the IAB node MT Tx timing (IAB node MT Tx timing).

Finally, the IAB node MT Tx timing is adjusted based on the obtained timing adjustment amount, so that the IAB node MT Tx timing is aligned with the IAB DU Tx timing, that is, the third row and the fourth row in FIG. 8. Specifically, the IAB node MT Tx timing may be delayed by one timing adjustment amount, so that the IAB node MT Tx timing is aligned with the IAB DU Tx timing.

By using the method disclosed herein, it may also be obtained that, the IAB node MT Tx timing is aligned with the IAB DU Tx timing by adjusting the IAB DU Tx timing, for example, by obtaining the timing adjustment amount in advance.

In conclusion, a timing adjustment configuration may include a timing adjustment value, and the timing adjustment value may be obtained through measurement. Specifically, the parent node or donor node configures the IAB node to send the downlink reference signal. The parent node measures a reference signal sent by the IAB node (or an IAB DU). The parent node compares an uplink receiving arrival time of a backhaul link between the parent node and the child node based on the measurement result, and may determine a timing difference. The parent node determines the timing difference as the timing adjustment amount.

The reference signal may be a synchronization signal (where the synchronization signal includes a primary synchronization signal PSS and a secondary synchronization signal SSS), or may be a CSI-RS (channel state information reference signal), or may be a DM-RS (demodulation reference signal). Alternatively, the reference signal may be a tracking reference signal (TRS). This is not limited in this patent.

Method 2: When spatial is enabled, a timing adjustment difference is obtained by using the IAB node 1, and is not obtained through measurement by the donor node. Therefore, the uplink transmission timing of the IAB node 1 is aligned with the downlink transmission timing of the IAB node 1.

In conclusion, for timing adjustment information, specifically, the timing adjustment amount TA may be specifically configured by using the following two methods:

(1) A plurality of timing adjustment configurations are configured in advance for the donor node or parent node, and each adjustment configuration corresponds to an index ID. In this case, a timing adjustment configuration index or an identity ID may also be configured in the configuration of the transmission mode to identify the timing adjustment amount.

(2) In the configuration of non-spatial multiplexing, the timing adjustment configuration is fixed.

It can be learned from the foregoing two manners that timing adjustment amounts TAs obtained in the spatial multiplexing transmission mode are different. Therefore, for different transmission modes, the timing adjustment information includes different timing adjustment amounts TAs, and it is very necessary to set different transmission parameter sets based on different transmission modes.

The foregoing provides only two possible methods for determining the timing adjustment, but a timing adjustment method is not necessarily limited to the two methods. In a case of spatial reception, a reception timing of the IAB node DU (that is, an uplink reception timing of the IAB node on the access link of the IAB node) needs to be aligned with a reception timing of the IAB node MT (that is, a downlink reception timing of the IAB node on the backhaul link). In this case, the IAB node may send a timing adjustment command to its child node to adjust the uplink transmission timing of the child node. The timing adjustment command may be used to delay uplink transmission of the child node, or may be used to adjust the uplink transmission of the child node, to complete symbol-level alignment.

Further, the transmission parameter may further include "effective time" information, used to identify an effective time or duration of the transmission parameter set. For example, one flag may be used to indicate that an effective time of the parameter is effective for next or later one or more slots, or effective only for a current scheduled slot.

Alternatively, in another possible case, if the transmission parameter is periodically effective, a specific period and offset need to be included, to determine a specific period length, and a time location in each period/frame.

Optionally, the protocol defines an initial or a default transmission parameter configuration. The configuration may be an index or an additional set of configurations delivered by using higher layer signaling.

S602. The second node sends the transmission configuration message to the first node.

S604. The first node receives the transmission configuration message.

S606. The second node sends a transmission indication message, where the transmission indication message includes the transmission configuration index information, and the transmission indication message is used to indicate the first node to apply the transmission parameter corresponding to the transmission configuration index information.

The transmission indication message is sent by being carried on downlink control information DCI or a media access control control element (MAC CE).

S608. The first node obtains the transmission indication message.

The foregoing step S606 is optional. If the first node obtains the transmission indication message, S606 is not required. If it is generated and delivered by a parent node or a donor node of the first node in S606, S606 is reserved.

S610. The first node performs, based on the transmission configuration index information in the transmission indication message, data transmission by using the transmission parameter corresponding to the transmission configuration index information.

For ease of understanding, the following provides an example of a message format of the transmission configuration index information in Embodiment 1. The following uses an information element format of TS 38.331 as an example, but this solution is not limited to the following form. A format, an information element name, and an information element level of each configuration may be different.

If the IAB node receives the following configuration information (an RRC message) in step 2, the parent node can quickly configure/modify the transmission parameter of the IAB node by including the TransmissionMode-Id in the DCI or the MAC CE.

| TransmissionMode-Id information element |
|---|
| - TransmissionMode-Id |
| -- ASN1START |
| -- TAG-TransmissionMode-ID-START |
| TransmissionMode-Id ::=        INTEGER (0..maxNrofTransmissionModes) |
| -- TAG-TransmissionMode-ID-STOP |
| -- ASN1STOP |
| - TransmissionMode |

| Transmission Mode information element |
| --- |

```
1    -- ASN1START
2    -- TAG-Transmission-Mode-START
3
4    TransmissionMode ::=         SEQUENCE {
5       transmissionMode-Id              Transmission Mode-Id,
6       subcarrierSpacing            SubcarrierSpacing,
7       timingalign-Id                   Timingalign-Id,
8       dmrs-Position                ENUMERATED {pos0, pos1, pos3}   OPTIONAL, -- Need
9       tci-StateId                      TCI-StateId,
10      sri-PUSCH-ClosedLoopIndex        ENUMERATED { i0, i1 }
11   }
12   Timingalign-Id ::=           SEQUENCE {
13      tmta                         ENUMERATED {-ms0dot5,-ms0dot25, ms0, ms0dot25,
ms0dot5},
14      TAoffset                     INTEGER {-10,10}          OPTIONAL, -- Need M
15      ...
16   }
TDD-UL-DL-SlotConfig ::=          SEQUENCE {
    slotIndex                     TDD-UL-DL-SlotIndex,
    symbols                       CHOICE {
       allDownlink                   NULL,
       allUplink                     NULL,
       explicit                      SEQUENCE {
          nrofDownlinkSymbols              INTEGER (1..maxNrofSymbols-1)
          nrofUplinkSymbols            INTEGER (1..maxNrofSymbols-1)
       }
    }
}
17   -- TAG-Transmission-Mode-STOP
18   -- ASN1STOP
```

According to the transmission parameter configuration method provided in this embodiment of this application, because transmission parameters that need to be configured for nodes are different in different transmission modes, transmission parameters in the different transmission modes are combined by identifying transmission configuration index information of different transmission modes. During transmission, each corresponding transmission parameter set may be learned by configuring transmission configuration index information of a transmission mode. This not only reduces signaling overheads caused by a large quantity of parameters during transmission, but also greatly reduces a transmission delay and improves transmission performance by using lower layer signaling such as DCI. In this way, switching from one transmission mode to another transmission mode can be quickly implemented.

Another implementation or embodiment is described as follows:

In the foregoing embodiment, the message format of the transmission configuration index information is a type of a newly added message or a newly defined message format. This may alternatively be implemented by using an existing message, for example, extension of a bandwidth part identity (BWP ID). Specifically, the transmission configuration index information is added to a BWP configuration. For example, the BWP ID is used to identify the transmission configuration index information. In the current protocol, a BWP configuration method is similar to Embodiment 1. That is, a BWP is configured by using the RRC, and is switched by using the DCI. There are a total of four BWPs. The DCI occupies two bits, to indicate a specific one of the four BWPs.

Essentially, parameters enumerated in Embodiment 1 are added to the BWP configuration in the definition of the key term.

The configuration format of the BWP is as follows:

The BWP is a UE-specific configuration. In other words, the BWP is separately configured and scheduled by the base station for each UE. The BWP is not fixed for a cell. A difference between the BWP and carrier aggregation (CA) lies in that, on one carrier, the base station may configure four uplink and/or downlink BWPs, and one UE can have only one active BWP at one moment.

Each BWP can be configured with partial or complete uplink and downlink physical resources.

| BWP information element |
| --- |

```
-- ASN1START
   -- TAG-BANDWIDTH-PART-START
   BWP ::=                      SEQUENCE {
      location AndBandwidth        INTEGER (0..37949),
      subcarrierSpacing            SubcarrierSpacing,
      cyclicPrefix                 ENUMERATED { extended }
   OPTIONAL -- Need R
   }
   BWP-Uplink ::=               SEQUENCE {
      bwp-Id                       BWP-Id,
      bwp-Common                   BWP-UplinkCommon          OPTIONAL, -
- Need M
      bwp-Dedicated                BWP-UplinkDedicated
   OPTIONAL, -- Need M
```

-continued

| BWP information element | |
|---|---|
| ...<br>}<br>BWP-UplinkCommon ::=<br>  genericParameters<br>  rach-ConfigCommon<br>  OPTIONAL, -- Need M<br>  pusch-ConfigCommon<br>  OPTIONAL, -- Need M<br>  pucch-ConfigCommon<br>  OPTIONAL, -- Need M<br>  ...<br>}<br>BWP-UplinkDedicated ::=<br>  pucch-Config<br>  OPTIONAL, -- Need M<br>  pusch-Config<br>  OPTIONAL, -- Cond SetupOnly<br>  configured GrantConfig<br>  OPTIONAL, -- Need M<br>  srs-Config<br>  OPTIONAL, -- Need M<br>  beam FailureRecoveryConfig<br>  OPTIONAL, -- Cond SpCellOnly<br>  ...<br>}<br>BWP-Downlink ::=<br>  bwp-Id<br>  bwp-Common<br>- Need M<br>  bwp-Dedicated<br>  OPTIONAL, -- Need M<br>  ...<br>}<br>BWP-DownlinkCommon ::=<br>  genericParameters<br>  pdcch-ConfigCommon<br>  OPTIONAL, -- Need M<br>  pdsch-ConfigCommon<br>  OPTIONAL, -- Need M<br>  ...<br>}<br>BWP-DownlinkDedicated ::=<br>  pdcch-Config<br>  OPTIONAL, -- Need M<br>  pdsch-Config<br>  OPTIONAL, -- Need M<br>  sps-Config<br>  OPTIONAL, -- Need M<br>  radioLinkMonitoringConfig<br>  OPTIONAL, -- Need M<br>  ...<br>}<br>-- TAG-BANDWIDTH-PART-STOP<br>-- ASN1STOP | SEQUENCE {<br>  BWP,<br>  SetupRelease { RACH-ConfigCommon }<br><br>  SetupRelease { PUSCH-ConfigCommon }<br><br>  SetupRelease { PUCCH-ConfigCommon }<br><br><br><br>SEQUENCE {<br>  SetupRelease { PUCCH-Config }<br><br>  SetupRelease { PUSCH-Config }<br><br>  SetupRelease { ConfiguredGrantConfig }<br><br>  SetupRelease { SRS-Config }<br><br>  SetupRelease { BeamFailureRecoveryConfig }<br><br><br><br>SEQUENCE {<br>  BWP-Id,<br>  BWP-DownlinkCommon        OPTIONAL, -<br><br>  BWP-DownlinkDedicated<br><br><br><br>SEQUENCE {<br>  BWP,<br>  SetupRelease { PDCCH-ConfigCommon }<br><br>  SetupRelease { PDSCH-ConfigCommon }<br><br><br><br>SEQUENCE {<br>  SetupRelease { PDCCH-Config }<br><br>  SetupRelease { PDSCH-Config }<br><br>  SetupRelease { SPS-Config }<br><br>  SetupRelease { RadioLinkMonitoringConfig }<br><br> |

In the BWP configuration, similar to the solution in Embodiment 1, there are specifically two implementations to add a timing adjustment parameter.

A plurality of timing adjustment configurations are configured in advance for the donor node or the parent node, and each adjustment configuration corresponds to one index ID. In this case, the ID of the timing adjustment configuration is displayed in the BWP configuration.

The specific timing adjustment configuration is directly displayed in the BWP configuration.

The BWP switch of the DCI can be used to quickly adjust timing-related parameters for a special transmission mode such as the spatial multiplexing.

The BWP configuration includes a configuration of a semi-static configuring unavailable/zero-power DMRS port, or a limitation on a set of DMRS ports that may be used by the BH link. The child IAB node allocates the DMRS to the access link based on the DMRS port configuration in the BWP configuration.

The effective time of the BWP ranges from 2 ms to 2560 ms based on bwp-Inactivity Timer. spatial transmission may have a shorter effective time, for example, one or two slots. Therefore, if the spatial transmission is activated through the BWP switch. Optionally, the effective time information of the transmission parameter needs to be included.

Same as Embodiment 1:

For example, one flag may be used to indicate that an effective time of the parameter is effective for next or later one or more slots, or effective only for the current scheduled slot.

Alternatively, in another possible case, if the transmission parameter is periodically effective in the BWP configuration, the specific period and offset need to be included, to determine the specific period length and the time location in each period/frame.

This solution is the same as Embodiment 1, and another parameter related to IAB spatial may be configured by using the BWP.

The BWP configuration may include an SDM time resource indication of a current BWP. Specifically, the spatial transmission is allowed for some slot symbols in one frame.

An indication may be included in the BWP configuration, to indicate directions of some flexible slots. In the current technology, a base station configures all slot directions of a cell as uplink, downlink, or flexible, that is, flexible slots. Directions of flexible slots are indicated by an SFI slot format indication in dynamic scheduling. In the spatial multiplexing, a base station may determine a slot direction of current spatial transmission, to reduce potential interference.

The BWP configuration may include a default transmit beam indication, which is used to simultaneously switch a receive beam and/or a transmit beam after the BWP is switched and a SDM mode is enabled, to suppress potential interference.

The transmission parameter is introduced into the BWP configuration, so that the BWP configuration becomes the BWP used in the special transmission mode. In this way, the parent node may switch an active BWP of the child node by using a BWP switch command, so as to apply/activate some transmission parameters. Compared with Embodiment 1, in the solution in Embodiment 2, no additional DCI (physical layer signaling) needs to be introduced, and an existing BWP switch mechanism is reused. Compared with the current technology, new information is included only in the RRC configuration of the BWP, and is used to determine a parameter in a specific transmission mode. That is, new configuration and signaling are added in Embodiment 1, and new air interface signaling does not need to be added in Embodiment 2.

The foregoing describes in detail the transmission parameter configuration method according to the embodiments of this application with reference to FIG. 1 to FIG. 8. The following describes a transmission apparatus according to the embodiments of this application with reference to the accompanying drawings. It should be understood that the technical features described in the method embodiments are also applicable to the following apparatus embodiments.

Figure 9:
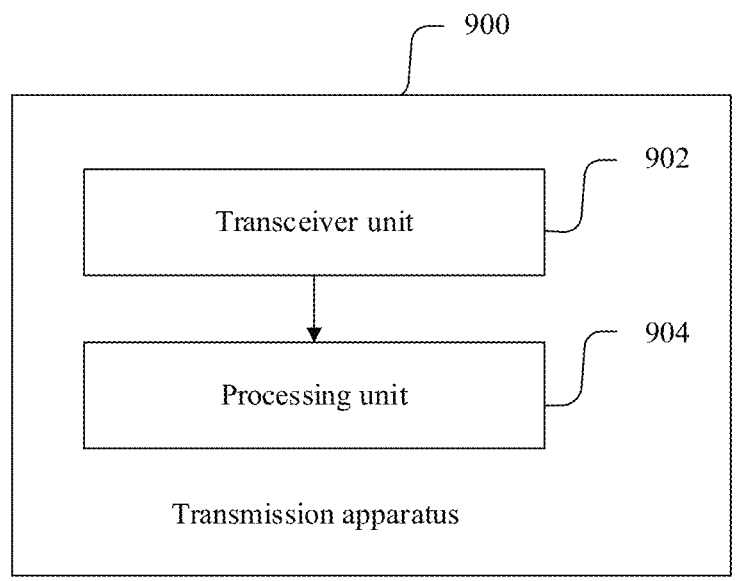
FIG. 9 is a schematic block diagram of a transmission apparatus according to an embodiment of this application.

FIG. 9 shows a schematic block diagram of a transmission apparatus according to an embodiment of this application. The apparatus is configured to perform the method performed by the second node in the foregoing method embodiments. Optionally, a specific form of the apparatus may be a relay node or a chip in a relay node, or may be terminal equipment or a chip in the terminal equipment. This is not limited in this embodiment of this application.

The apparatus includes:

a transceiver 902 and a processor 904.

The transceiver is configured to receive a transmission configuration message, where the transmission configuration message includes transmission configuration index information and a transmission parameter corresponding to the transmission configuration index information, and the transmission configuration index information is used to identify different transmission modes.

The processor is configured to: obtain a transmission indication message, where the transmission indication message includes the transmission configuration index information, and the transmission indication message is used to indicate to the transmission apparatus to apply the transmission parameter corresponding to the transmission configuration index information; determine, based on the transmission configuration index information, the transmission parameter corresponding to the transmission configuration index information; and perform data transmission by using the determined transmission parameter.

According to the transmission parameter configuration method provided in this embodiment of this application, because transmission parameters that need to be configured for nodes are different in different transmission modes, transmission parameters in the different transmission modes are combined by identifying transmission configuration index information of different transmission modes. During transmission, each corresponding transmission parameter set may be learned by configuring transmission configuration index information of a transmission mode. This not only reduces signaling overheads caused by a large quantity of parameters during transmission, but also greatly reduces a transmission delay and improves transmission performance by using lower layer signaling such as DCI. In this way, switching from one transmission mode to another transmission mode can be quickly implemented.

The transmission apparatus is configured to perform the transmission parameter configuration method shown in FIG. 6. Related technical features have been described in detail above with reference to the method shown in FIG. 6. Therefore, details are not described herein again.

Figure 10:
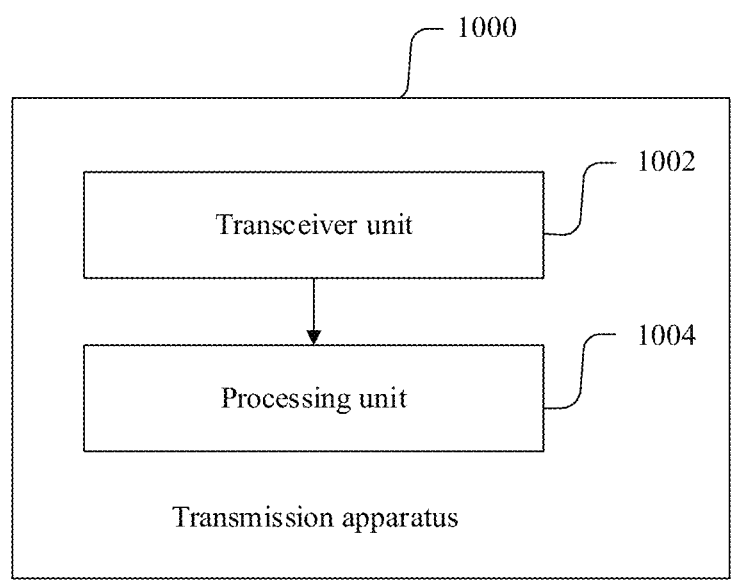
FIG. 10 is a schematic block diagram of another transmission apparatus according to an embodiment of this application.

FIG. 10 is a schematic structural diagram of another transmission apparatus according to an embodiment of this application. In a specific implementation process, the transmission apparatus may be a network device or a relay device, and the relay device may be a base station. The network device includes a transceiver 1002 and a processor 1004.

The transceiver 1002 is configured to receive a transmission configuration message, where the transmission configuration message includes transmission configuration index information and a transmission parameter corresponding to the transmission configuration index information, and the transmission configuration index information is used to identify different transmission modes.

The processor 1004 is configured to: obtain a transmission indication message, where the transmission indication message includes the transmission configuration index information, and the transmission indication message is used to indicate the transmission apparatus to apply the transmission parameter corresponding to the transmission configuration index information; determine, based on the transmission configuration index information, the transmission parameter corresponding to the transmission configuration index information; and perform data transmission by using the determined transmission parameter.

The network device is configured to perform the transmission parameter configuration method shown in FIG. 6. Related technical features have been described in detail above with reference to the method shown in FIG. 6. Therefore, details are not described herein again.

According to the transmission parameter configuration method provided in this embodiment of this application, because transmission parameters that need to be configured for nodes are different in different transmission modes, transmission parameters in the different transmission modes are combined by identifying transmission configuration index information of different transmission modes. During transmission, each corresponding transmission parameter set may be learned by configuring transmission configuration index information of a transmission mode. This not only reduces signaling overheads caused by a large quantity of parameters during transmission, but also greatly reduces a transmission delay and improves transmission performance by using lower layer signaling such as DCI. In this way, switching from one transmission mode to another transmission mode can be quickly implemented.

Figure 11:
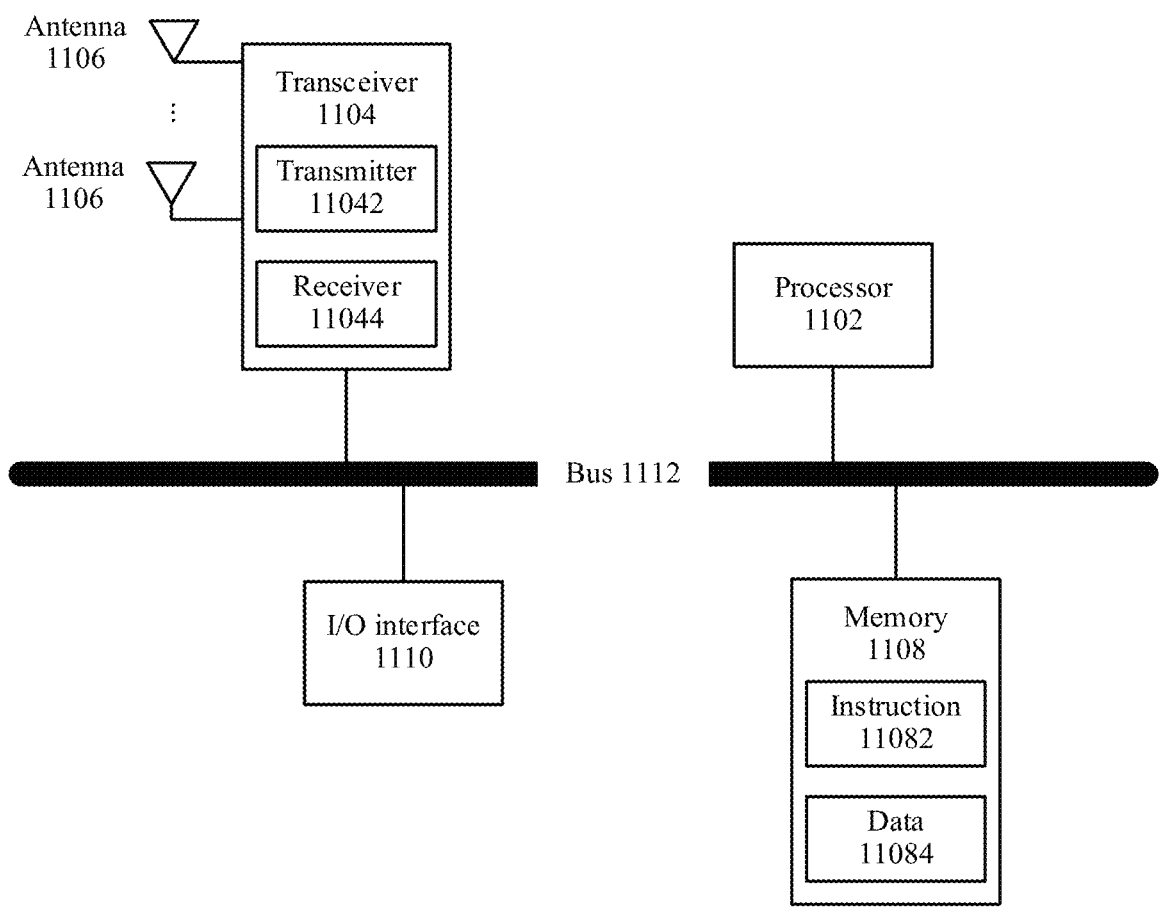
FIG. 11 is a schematic diagram of a hardware structure of a network device according to an embodiment of this application.

FIG. 11 is a schematic diagram of a hardware structure of a network device according to an embodiment of this application. As shown in FIG. 11, the network device includes a processor 1102, a transceiver 1104, a plurality of antennas 1106, a memory 1108, an I/O (input/output) interface 1110, and a bus 1112. The transceiver 1104 further includes a transmitter 11042 and a receiver 11044, and the memory 1108 is further configured to store an instruction 11082 and data 11084. In addition, the processor 1102, the transceiver 1104, the memory 1108, and the I/O interface 1110 are in communication connection with each other by using the bus 1112. The plurality of antennas 1106 are connected to the transceiver 1104.

The processor 1102 may be a general-purpose processor, for example, but is not limited to a central processing unit (CPU), or may be a dedicated processor, for example, but is not limited to a digital signal processor (DSP), an application-specific integrated circuit (ASIC), or a field programmable gate array (FPGA). In addition, the processor 1102 may alternatively be a combination of a plurality of processors. Particularly, in the technical solutions provided in the embodiments of this application, the processor 1102 may be configured to perform, for example, the operations performed by the processing unit in FIG. 9 and FIG. 10. The processor 1102 may be a processor specifically designed for performing the foregoing steps and/or operations, or may be a processor that performs the foregoing steps and/or operations by reading and executing the instruction 11082 stored in the memory 1108. The processor 1102 may need to use the data 11084 in a process of performing the foregoing steps and/or operations.

The transceiver 1104 includes the transmitter 11042 and the receiver 11044. The transmitter 11042 is configured to send a signal through at least one of the plurality of antennas 1106. The receiver 11044 is configured to receive the signal through at least one of the plurality of antennas 1106. Particularly, in the technical solutions provided in this embodiment of this application, through at least one of the plurality of antennas 1106, the transmitter 11042 may be specifically configured to perform, for example, the operations performed by the processing unit in FIG. 9 and FIG. 10.

The memory 1108 may be various types of storage media, for example, a random access memory (RAM), a read-only memory (ROM), a non-volatile RAM (NVRAM), a programmable ROM (PROM), an erasable PROM (EPROM), an electrically erasable PROM (EEPROM), a flash memory, an optical memory, or a register. The memory 1108 is specifically configured to store the instruction 11082 and the data 11084. The processor 1102 may perform the foregoing steps and/or operations by reading and executing the instruction 11082 stored in the memory 1108, and may need to use the data 11084 in a process of performing the foregoing steps and/or operations.

The I/O interface 1110 is configured to receive an instruction and/or data from a peripheral equipment, and output an instruction and/or data to the peripheral device.

It should be noted that in a specific implementation process, the network device may further include other hardware components, which are not enumerated in this specification.

The hardware structure diagram of the network device may be a hardware structure diagram of the network device in FIG. 9 or FIG. 10.

The technical solutions provided in the embodiments of this application may be implemented by using a processor and a transceiver. The processor is configured to perform various processing operations, for example, but not limited to, operations such as generating, determining, judging, searching, extracting, obtaining, reading, and receiving input to-be-processed data and outputting processed data. The transceiver is configured to perform operations such as transmitting and receiving. In a specific implementation process, the processor may be implemented in the following manners.

In a first manner, the processor is a dedicated processor. In this case, the processor may further include an interface circuit and a processing circuit. The interface circuit is configured to: receive data that needs to be processed by the processing circuit, and output a processing result of the processing circuit. The processing circuit is configured to perform the foregoing processing operations.

In a second manner, the processor is implemented by using an architecture of a general-purpose processor and a memory. The general-purpose processor is configured to execute processing instructions stored in the memory, and the processing instructions are used to indicate the general-purpose processor to perform the foregoing processing operations. It is not difficult to understand that the processing performed by the general-purpose processor depends on the processing instructions stored in the memory. By modifying the processing instructions in the memory, the general-purpose processor may be controlled to output different processing results.

Further, in the second manner, the general-purpose processor and the memory may be integrated on a same chip. For example, both the general-purpose processor and the memory may be integrated on a processing chip. In addition, the general-purpose processor and the memory may alternatively be disposed on different chips. For example, the general-purpose processor is disposed on a processing chip, and the memory is disposed on a storage chip.

The technical solutions provided in the embodiments of this application may alternatively be implemented by using a computer-readable storage medium, and the computer-readable storage medium stores a processing instruction for implementing the technical solutions in the embodiments of this application. The instruction is provided to be read by a general-purpose processing device, to complete the technical solutions provided in the embodiments of this application. The foregoing general-purpose processing device should be understood as a processing device that includes necessary hardware components such as a processor and a transceiver. Operations of the hardware components depend on the processing instruction stored in the computer-readable storage medium.

All or some of the foregoing embodiments may be implemented by using software, hardware, firmware, or any combination thereof. When software is used to for implementation, the method may be implemented completely or partially in a form of a computer program product. The computer program product includes one or more computer instructions. When the computer program instruction is loaded and executed on a computer, the procedure or functions according to the embodiments of this application are completely or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In summary, the foregoing descriptions are merely examples of embodiments of this application, but are not intended to limit the protection scope of this application. Any modification, equivalent replacement, or improvement made without departing from the principle of this application shall fall within the protection scope of this application.

What is claimed is:

1. A transmission parameter configuration method, comprising:
   receiving, by an integrated access and backhaul (IAB) node, a transmission configuration message, wherein the transmission configuration message comprises transmission configuration index information and a transmission parameter corresponding to the transmission configuration index information, and the transmission configuration index information is used to identify different transmission modes, each transmission mode comprises at least one of: spatial multiplexing transmission between a mobile terminal (MT) and a distributed unit (DU) of the IAB node or non-spatial multiplexing transmission between the MT and the DU of the IAB node; wherein the transmission parameter comprises information of effective time; the information of the effective time is used to indicate the effective time of the transmission parameter, and the effective time comprises one or more slots; or the transmission parameter comprises a period and an offset, wherein the period and the offset are used to determine a length of the period and a time location at which the transmission parameter is effective in the period;
   obtaining, by the IAB node, the transmission configuration index information; and
   performing, by the IAB node based on the obtained transmission configuration index information, data transmission by using the transmission parameter corresponding to the obtained transmission configuration index information.

2. The method according to claim 1, wherein the transmission parameter comprises at least one or more of the following: timing adjustment information, DMRS port information, a power control parameter, time resource information, slot direction information, receive beam information, transmit beam information, a subcarrier spacing, or an effective time.

3. The method according to claim 2, wherein the timing adjustment information is used to adjust a sending time of the IAB node or a receiving time of the IAB node, and the timing adjustment information is obtained by the IAB node through calculation.

4. The method according to claim 1, wherein a transmission indication message is carried on downlink control information (DCI) or a media access control control element (MAC CE).

5. The method according to claim 1, wherein the transmission configuration index information comprises a bandwidth part identity (BWP ID).

6. An integrated access and backhaul (IAB) node, comprising:
   a transceiver, configured to receive a transmission configuration message, wherein the transmission configuration message comprises transmission configuration index information and a transmission parameter corresponding to the transmission configuration index information, the transmission configuration index information is used to identify different transmission modes, and each transmission mode comprises at least one of: spatial multiplexing transmission between a mobile terminal (MT) and a distributed unit (DU) of the IAB or non-spatial multiplexing transmission between the MT and the DU of the IAB; wherein the transmission parameter comprises information of effective time; the information of the effective time is used to indicate the effective time of the transmission parameter, and the effective time comprises one or more slots; or the transmission parameter comprises a period and an offset, wherein the period and the offset are used to determine a length of the period and a time location at which the transmission parameter is effective in the period; and
   a processor, configured to: obtain the transmission configuration index information; determine, based on the transmission configuration index information, the transmission parameter corresponding to the transmission configuration index information; and perform data transmission by using the determined transmission parameter.

7. The apparatus according to claim 6, wherein the transmission parameter comprises at least one or more of the following: timing adjustment information, DMRS port information, a power control parameter, time resource information, slot direction information, receive beam information, transmit beam information, a subcarrier spacing, or an effective time.

8. The apparatus according to claim 7, wherein the timing adjustment information is used to adjust a sending time of the IAB node or a receiving time of the IAB node, and the timing adjustment information is obtained by the IAB node through calculation.

9. The apparatus according to claim 7, wherein for one of the receive beam information and the transmit beam information, the beam information is identified by a configured channel state information reference signal (CSI-RS) identifier (ID), an index of the CSI-RS, or a resource of the CSI-RS.

10. The apparatus according to claim 6, wherein the transmission indication message is carried on downlink control information (DCI) or a media access control control element (MAC CE).

11. The apparatus according to claim 6, wherein the transmission configuration index information comprises a bandwidth part identity (BWP ID).

12. A transmission apparatus, comprising:

a processor, configured to generate a transmission configuration message, wherein the transmission configuration message comprises transmission configuration index information and a transmission parameter corresponding to the transmission configuration index information, and the transmission configuration index information is used to identify different transmission modes, wherein each transmission mode comprises at least one of: spatial multiplexing transmission between a mobile terminal (MT) and a distributed unit (DU) of an integrated access and backhaul (IAB) node or non-spatial multiplexing transmission between the MT and the DU of the IAB node; wherein the transmission parameter comprises information of effective time; the information of the effective time is used to indicate the effective time of the transmission parameter, and the effective time comprises one or more slots; or the transmission parameter comprises a period and an offset, wherein the period and the offset are used to determine a length of the period and a time location at which the transmission parameter is effective in the period; and a transceiver, configured to send the transmission configuration message.

13. The apparatus according to claim 12, wherein the transmission parameter comprises at least one or more of the following: timing adjustment information, DMRS port information, a power control parameter, time resource information, slot direction information, receive beam information, transmit beam information, a subcarrier spacing, or an effective time.

14. The apparatus according to claim 13, wherein the timing adjustment information is used to adjust a sending time of another node or a receiving time of another node, and the timing adjustment information is obtained by a second node through calculation.

15. The apparatus according to claim 13, wherein for one of the receive beam information and the transmit beam information, the beam information is identified by a configured channel state information reference signal (CSI-RS) identifier (ID), an index of the CSI-RS, or a resource of the CSI-RS.

16. The apparatus according to claim 12, wherein the transceiver is further configured to send a transmission indication message, wherein the transmission indication message comprises the transmission configuration index information, and the transmission indication message is used to indicate another node to apply the transmission parameter corresponding to the transmission configuration index information.

17. The apparatus according to claim 16, wherein the transmission indication message is carried on downlink control information (DCI) or a media access control control element (MAC CE).

18. The apparatus according to claim 12, wherein the transmission configuration index information comprises a bandwidth part identity (BWP ID).

* * * * *